May 18, 1965     H. STÜDLI, SR     3,183,556
HYDRAULIC PRESS
Filed Aug. 27, 1963     2 Sheets-Sheet 2

INVENTOR
HANS STUDLI

BY *Irwin and Smiley*
ATTORNEYS

United States Patent Office 3,183,556
Patented May 18, 1965

3,183,556
HYDRAULIC PRESS
Hans Stüdli, Sr., Winterthur-Hard, Switzerland
Filed Aug. 27, 1963, Ser. No. 304,858
Claims priority, application Switzerland, Sept. 11, 1962,
10,730/62
5 Claims. (Cl. 18—30)

In hydraulic presses, especially in mold clamping equipment for injection molding machines, the pressing member usually performs a feed motion over a relatively long distance and exerts a very heavy ram pressure at the end of the stroke. The feed motion should be effected within a relatively short time, whereas at the end of the stroke, when the ram pressure is extremely high, the travel of the pressure exerting member is substantially reduced. Up to now, toggle lever type transmission members were used in most cases to produce the feed motion; this type of transmission members such as levers and links, owing to the occurring high pressures, are exposed to a relatively severe strain and will soon wear out which in turn will result in troubles and shutdown of the plant. Therefore, attempts have been made to drive the pressure exerting member with purely hydraulic means. If, however, in order to obtain high ram pressures a hydraulic compression equipment of a large diameter is employed, this will result in a corresponding slow feed motion. Proposals have also been made for using two pressure pumps one of which was to generate a low ram pressure for the rapid feed motion whereas the second was to produce the high final ram pressure. This, however, will make the whole pressing equipment more complicated and expensive, and difficulties are encountered with the high ram pressures required.

The object of the present invention is to eliminate these disadvantages by the provision of a hydraulic press, particularly a mold clamping equipment for injection molding machines in which both the pressure for the feed motion of a pressing member and the final pressure exerted on this pressing member are produced by hydraulic pressing units.

According to the invention a first hydraulic pressing unit of a small diameter for obtaining rapid feed motion of the pressing member and a second hydraulic pressing unit of a large diameter for obtaining a final slow motion are connected in series, the pressure chamber of the first hydraulic unit being adapted to be closed so that the fluid pressure occurring therein is increased as the second hydraulic pressing unit starts operating.

The accompanying drawings illustrate an embodiment of the present invention.

Figure 1:
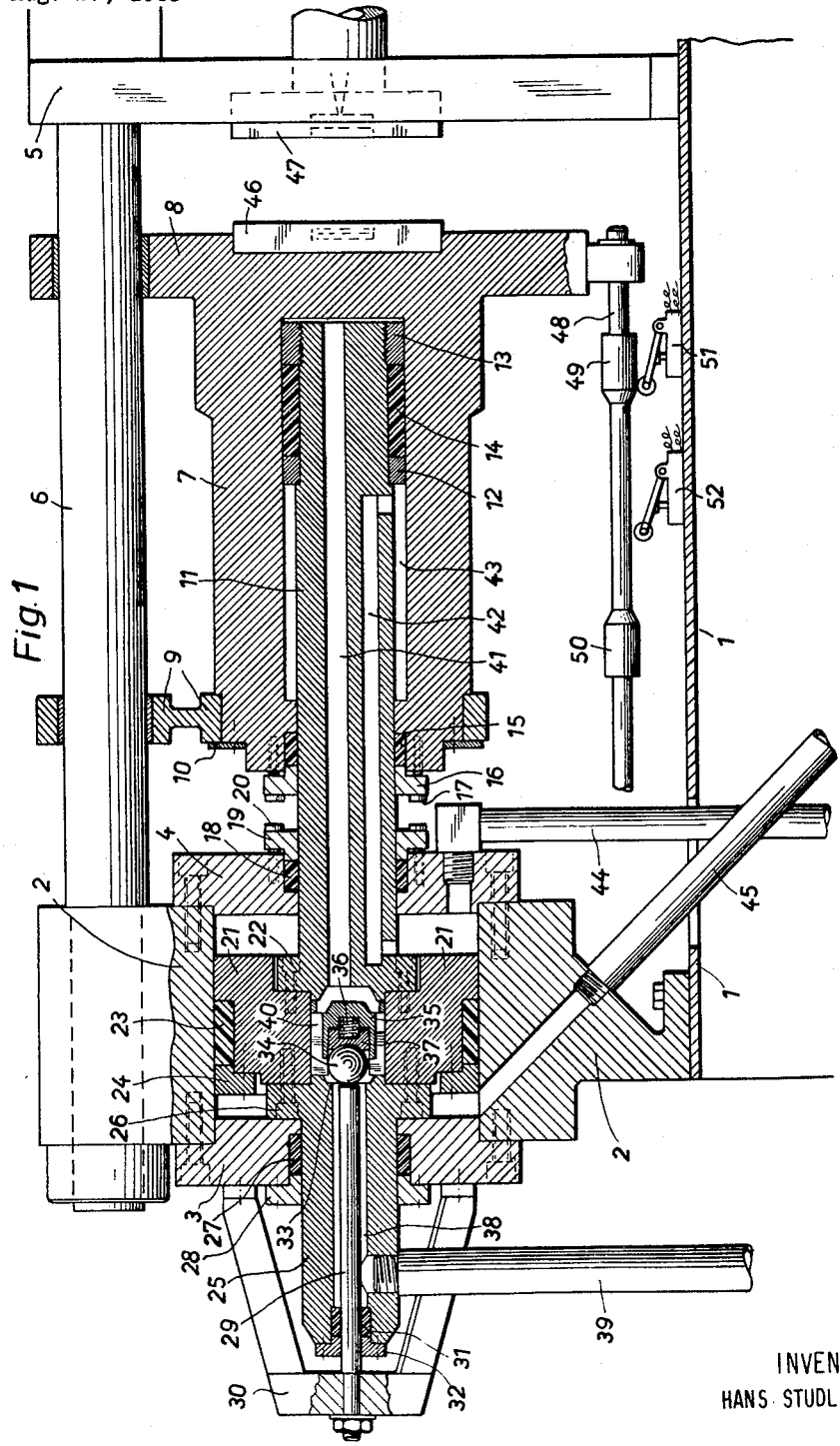
FIGURE 1 is a longitudinal section of a mold clamping equipment for an injection molding machine with the mold halves shown in open position.

On the base 1 a cylinder 2 is mounted to which ring plates 3, 4 are attached on either side. Two guide rods 6 extend from an upper shoulder of cylinder 2 to a platen 5 receiving the stationary mold half and resting on base 1, only one of the guide rods being shown in the drawing. A cylinder 7 is supported by the two guide rods 6 by means of a flange 8 and a ring member 9 retained on cylinder 7 by means of a holding disk 10, cylinder 7 being arranged in such a way as to be axially movable. Cylinder 7 moves along piston rod 11 carrying in the cylinder a piston which is formed by two metal rings 12, 13 and an intermediary barrel ring 14. The piston 12–14 constitutes, together with cylinder 7 a first hydraulic pressing unit of a relatively small diameter. Where the piston rod 11 emerges from the cylinder 7 a gasket ring 15 is fitted into the cylinder, the gasket ring being secured by a holding ring 16 and bolts 17. The piston rod 11 also passes through the annular plate 4 to which a seal ring 18 is attached by means of a holding ring 19 and bolts 20. At the left end of piston rod 11 a piston 21 movable in the cylinder 2 is secured to the rod by means of bolts 22. The piston 21 carries on its circumference a barrel ring 23 and a holding ring 24 to secure the position of barrel ring 23. Together with cylinder 2 and plates 3, 4 the piston 21 constitutes the second hydraulic pressing unit having a larger diameter than the first hydraulic pressing unit 7 and 12–14. On the left-hand side of the piston 21 a hollow rod 25 is secured by means of bolts 26, which hollow rod 25 passes through the ring plate 3 in which a seal ring 27 is retained by a holding ring 28. A stop rod 29 reaches into the hollow space of rod 25, the stop rod 29 being secured to a collar 30 attached to the ring plate 3. A terminal seal ring 31 is fixed to the hollow rod 25 by means of a holding ring 32. A valve seat 33 is formed at the right end of hollow rod 25 to receive a ball valve 34 against which the right end of stop rod 29 comes to rest. The ball valve 34 is received in a cylindrical recess of a bearing box 35 arranged in the piston 21, the said cylindrical recess also receives a sliding plug 37 actuated by a spring 36, the plug 37 acting in turn on the ball valve 34. The hollow rod 25 has a hollow space 38 around stop rod 29 to allow for the passage of hydraulic fluid, such as oil, which is supplied through a high pressure hose 39 connecting with hollow rod 25. With the ball valve 34 pressed against the sliding plug 37 by stop rod 29, (see FIG. 1), the hollow space 38 communicates with channels 40 in the bearing-box 35, which channels 40 communicate in turn with a longitudinal channel 41 provided in the piston rod 11, this longitudinal channel 41 extending until the right-hand end of piston rod 11. A further longitudinal channel 42 formed in the piston rod 11 communicates at the right end with an annular space 43 between piston rod 11 and cylinder 7, while at the left end it communicates with the cylinder space provided at the right end of the piston 21, to which space a hydraulic fluid supply conduit 44 is connected. Another hydraulic fluid supply conduit 45 is connected with the cylinder space 53 provided on the left side of the piston 21.

The cylinder 7 effecting the feed motion carries a movable half 46 of the die mold, the stationary mold half 47 of which is attached to the platen 5 supported by the base 1.

A control rod 48 is disposed on the collar 8 of cylinder 7 on which control rod 48 two switch cams 49, 50 are adjustably arranged for cooperation with end switches 51, 52.

Figure 2:
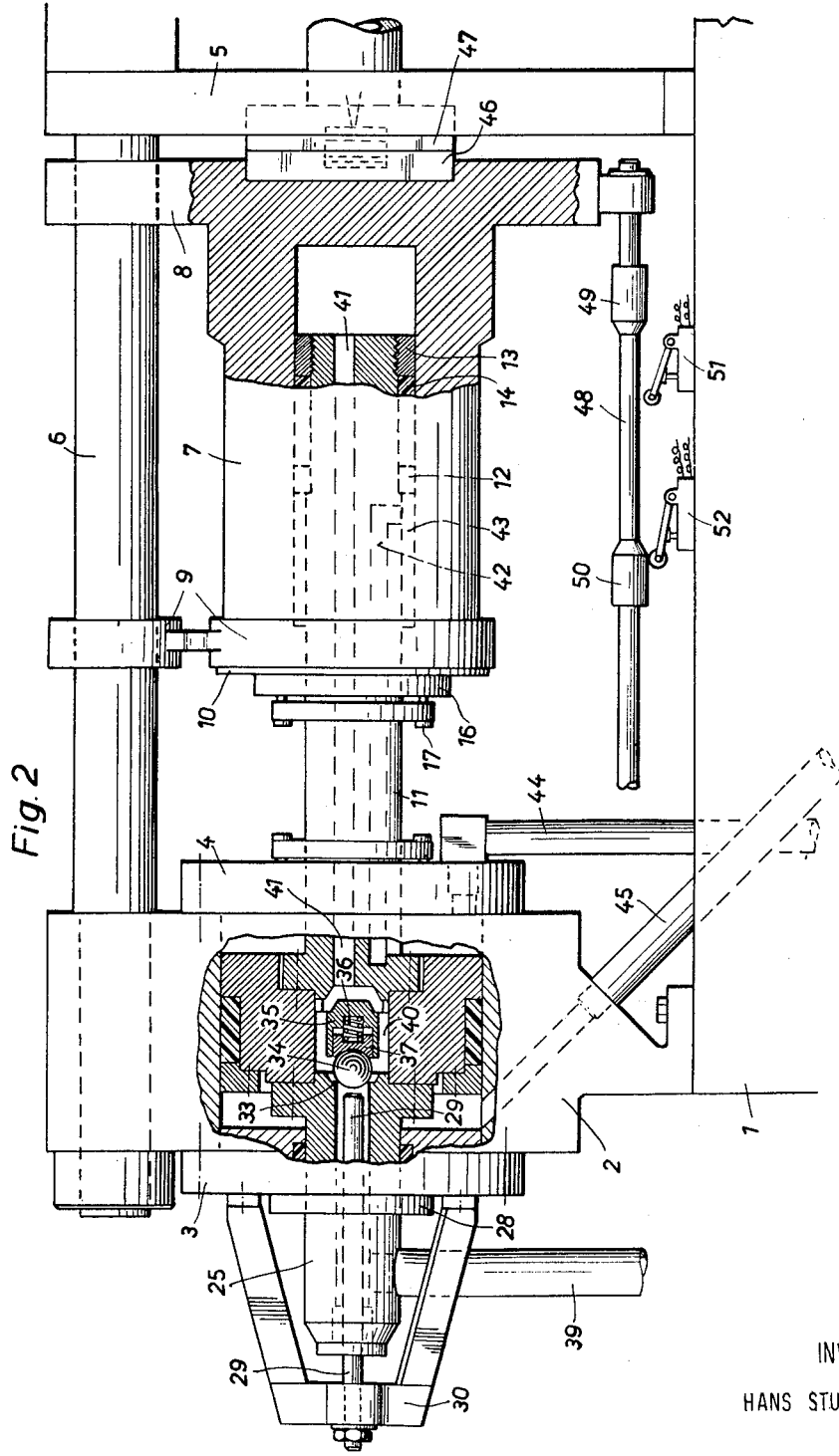
FIGURE 2 is a side elevation of the mold clamping equipment shown partly in section and with the mold halves clamped together.

The mold clamping equipment for injection molding machines as described above operates as follows:

In the open position of the mold as shown in FIGURE 1, cylinder 7 and piston rod 11 with the piston 12–14 and ram 21 are located in the left-hand end position in which the ball valve 34 is lifted off its seat 33 by stop rod 29. When, in this position, the hydraulic fluid is allowed to flow through the high pressure conduit 39 by shifting a control valve, hydraulic fluid will pass through the hollow space 38, through the ducts 40 and through the longitudinal duct 41 into the right-hand cylinder space of cylinder 7 of the first hydraulic pressing unit having a small diameter. This causes the cylinder 7 together with mold half 46 to move quickly from the left to the right, so as to be displaced from the position as shown in FIGURE 1 to that of FIGURE 2 whereby the hydraulic fluid will be discharged from the annular space 43 through duct 42 and pipe 44. As soon as the mold half 46 abuts against mold half 47, a valve in the supply conduit 45 will be shifted by the action of cam 50 on the end switch 52, so as to allow the hydraulic fluid to flow to the left side 53 of the big piston 21 and so as to allow the ram 21 to start moving from the left to the right. Already a short amount of travel suffices to press the seat 33 against the ball valve 34 and to move the latter slightly away from stop rod 29. Thus the supply of fluid to the pressure chamber inside cylinder 7 of the first pressing unit is shut off, so that upon further displacement of the piston 21 to the right the pressure within the pressure chamber increases according to the relationship between the diameter of the smaller piston 12–14 and that of the bigger piston 21. Thus a higher piston pressure is brought to bear on the mold half 46 which pressure will be maintained for the purpose of cooling or setting of the molded article during an adjustable period varying e.g. from five seconds to one minute (see FIG. 2). After the predetermined time has come to an end, the valves in the supply conduits 44, 45 are shifted so as to permit the hydraulic fluid to enter through conduit 44 and to flow back through conduit 45. This causes the piston 21 to move from the position of FIGURE 2 towards the left, together with the piston rod 11 and the piston 12–14 which also moves to the left so that the pressure inside the pressure chamber of cylinder 7 is released and the mold half 46 slowly starts to separate from the mold half 47. After the piston 21 has covered a certain distance, the ball valve 34 is lifted off its seat 33 and the hydraulic fluid is now allowed to flow back from the pressure chamber of cylinder 7 through duct 41, ducts 40, hollow space 38 and high pressure conduit 39, whereas the hydraulic fluid entering through conduit 44 and longitudinal duct 42 into the annular space 43, causes the cylinder 7 to effect its retracting motion separating thus the mold halves 46, 47 and permitting the finished molded article to be removed or rejected. The cylinder returns to the position of FIGURE 1 in which the hydraulic fluid supply can be shifted by means of the cam 49 and switch 51 so that the operating cycle may start again. By adjusting the cam 49 on the control rod 48, the amount of feed motion may be varied or adjusted.

I claim:
1. A fluid pressure press, particularly a mold clamping press for injector molding machines, comprising a frame, a first fluid pressure unit having a movable pressure applying first cylinder secured to a movable mold part for movement toward a fixed mold part, a first piston in said cylinder and a first pressure chamber between said first piston and said first cylinder for connection to a pressure fluid supply and acting to move said first cylinder, said first pressure unit generating the rapid feed motion of said cylinder; a second fluid pressure unit having a stationary second cylinder, a second piston movable therein, and a second pressure chamber between said second piston and said second cylinders for connection to a fluid pressure supply to move said second piston, said second pressure chamber being of greater effective diameter than said first pressure chamber, the two fluid pressure units being mounted in series by a connection fixing the first piston to the second piston, and means for shutting off access of pressure fluid to said first pressure chamber upon actuation of said second pressure unit whereby to increase the fluid pressure acting on said movable first cylinder towards the end of its stroke.

2. A fluid pressure press according to claim 1, in which said means for shutting off access of pressure fluid to said first pressure chamber comprises a valve closed by movement of said second piston toward the fixed mold part.

3. A fluid pressure press according to claim 2, in which said valve is disposed within the second piston and cooperates with a stop fixed to the frame and extending into the said second piston to engage and open the valve upon movement of the second piston away from the fixed mold part.

4. A fluid pressure press according to claim 3, wherein said valve comprises a ball acted upon by a spring and cooperating with said fixed stop.

5. A fluid pressure press according to claim 1, in which said first movable cylinder which effects the fast feed motion is secured to a control rod on which cams are adjustably arranged to actuate end motion switches for alternating the connection of fluid pressure ducts to opposite ends of said first and second cylinders.

References Cited by the Examiner
UNITED STATES PATENTS

| | | | |
|---|---|---|---|
| 2,273,713 | 2/42 | Lawyer | 18—30 |
| 2,680,883 | 6/54 | Ashbaugh. | |
| 2,718,662 | 9/55 | Bohannon et al. | 18—30 |
| 3,008,189 | 11/61 | Harvey | 18—30 |

WILLIAM J. STEPHENSON, *Primary Examiner.*

MICHAEL V. BRINDISI, *Examiner.*